Patented July 17, 1923.

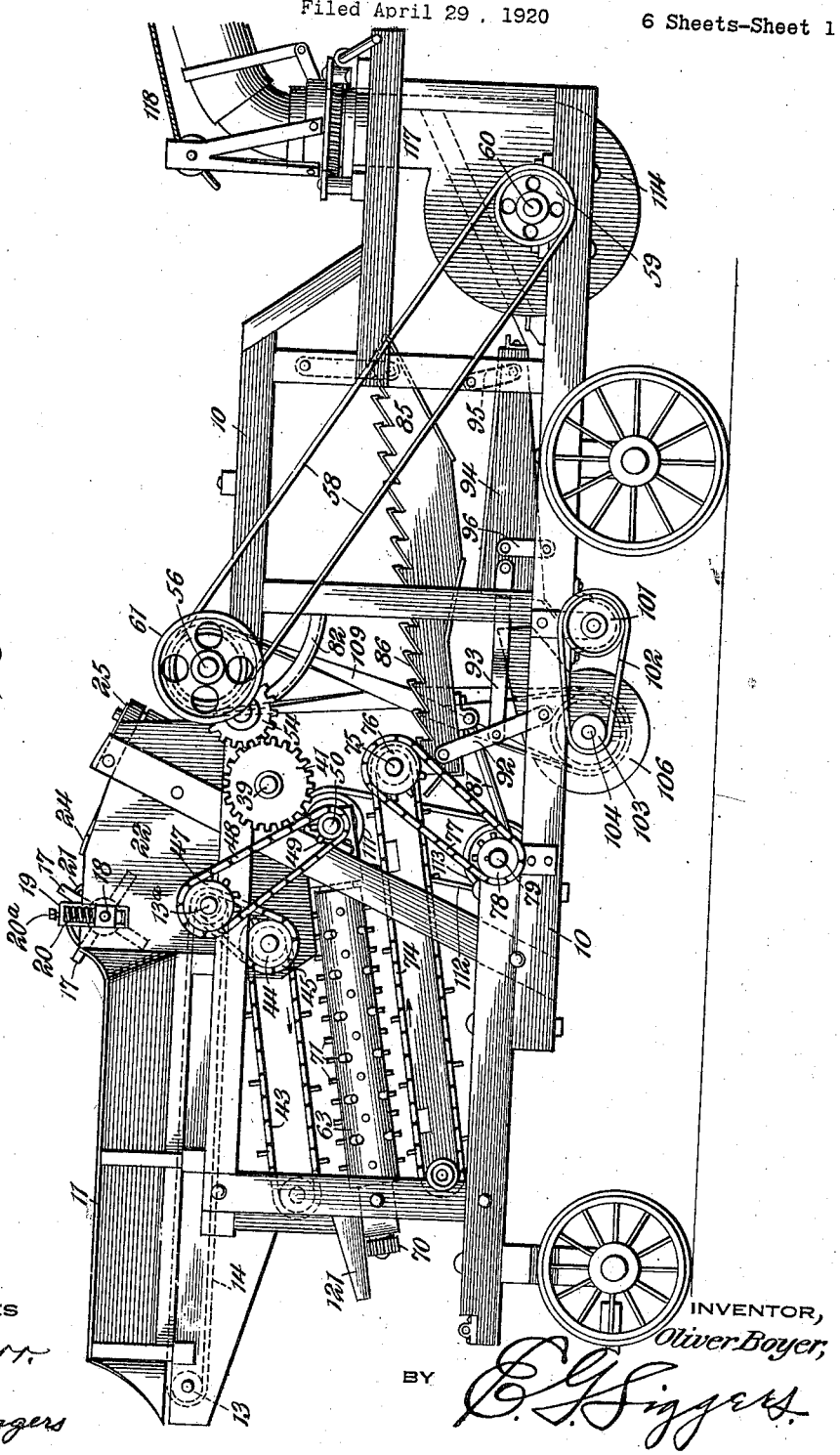

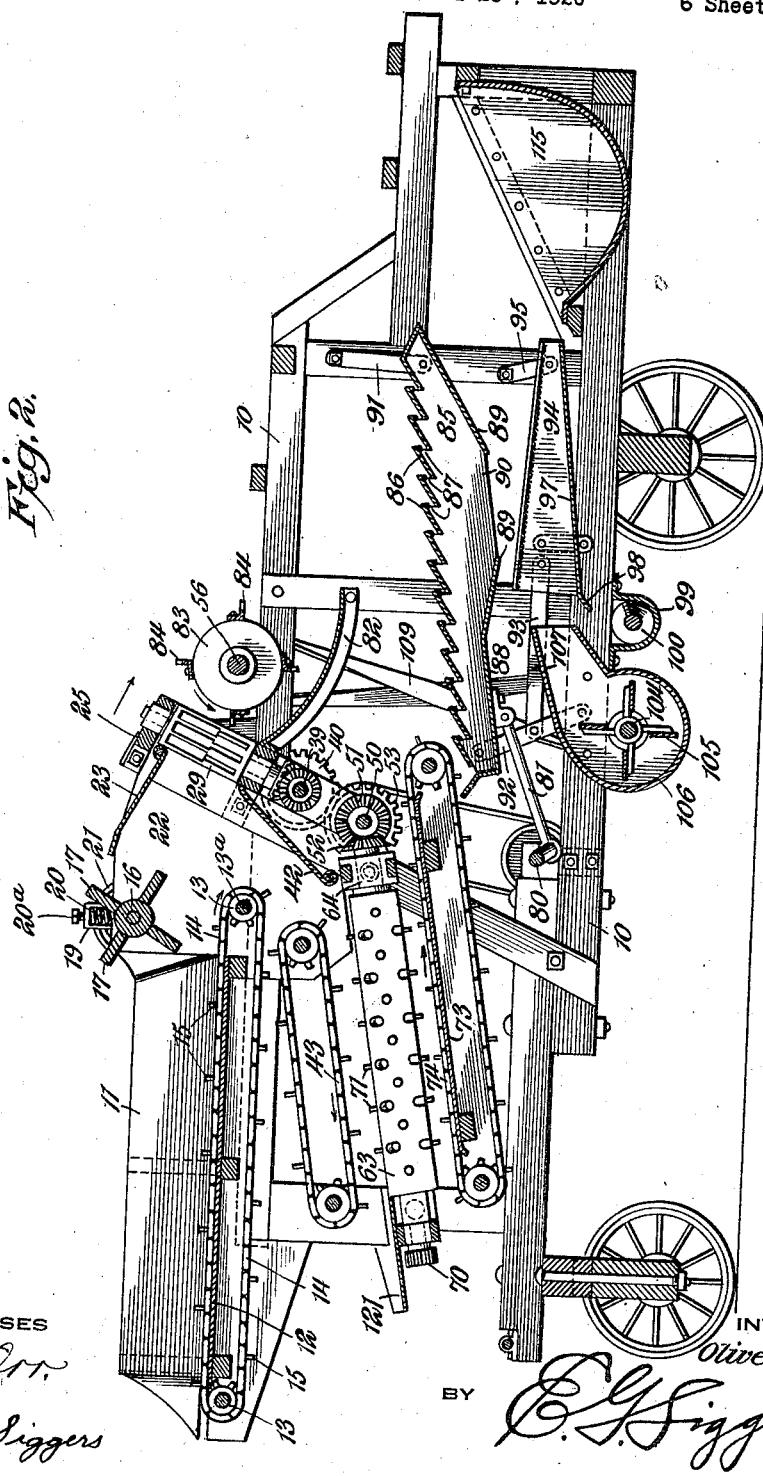

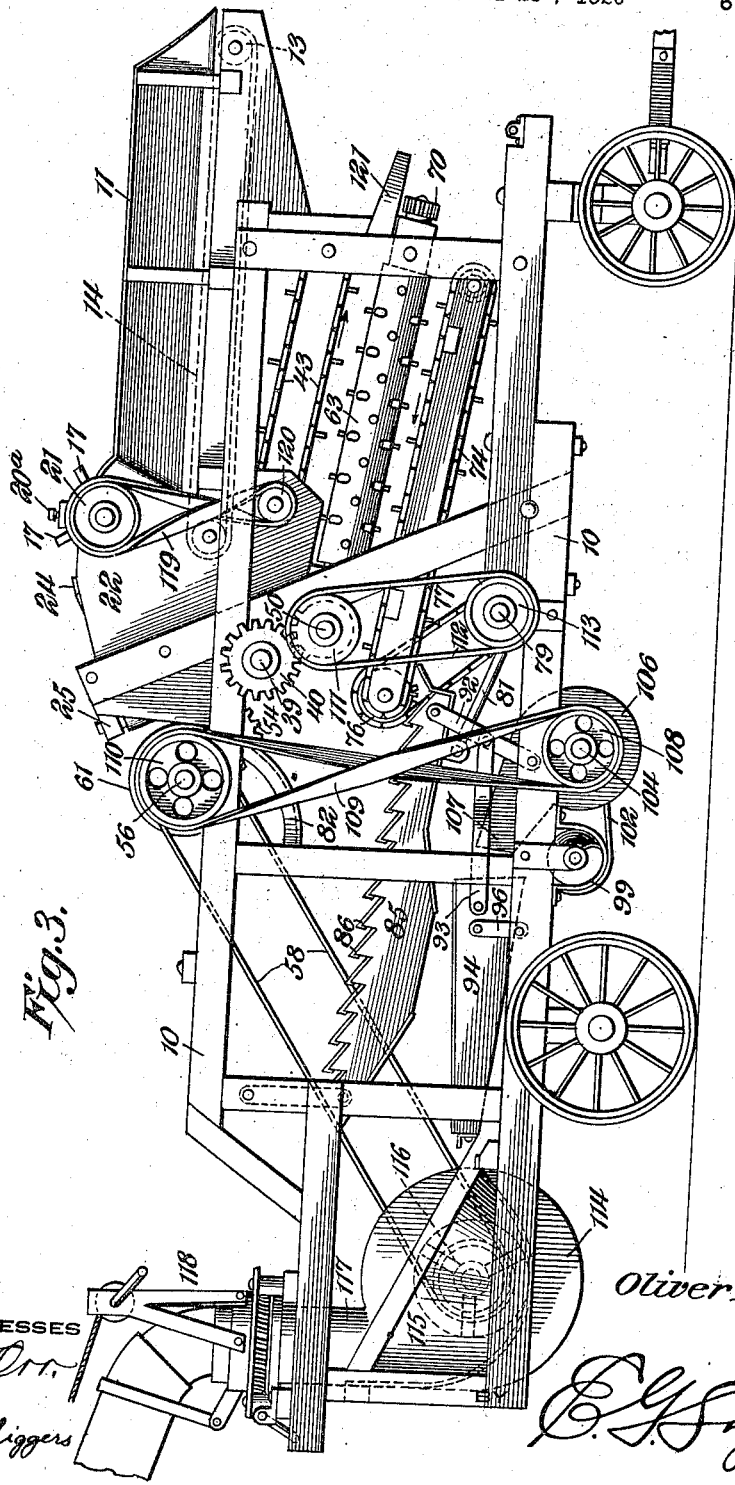

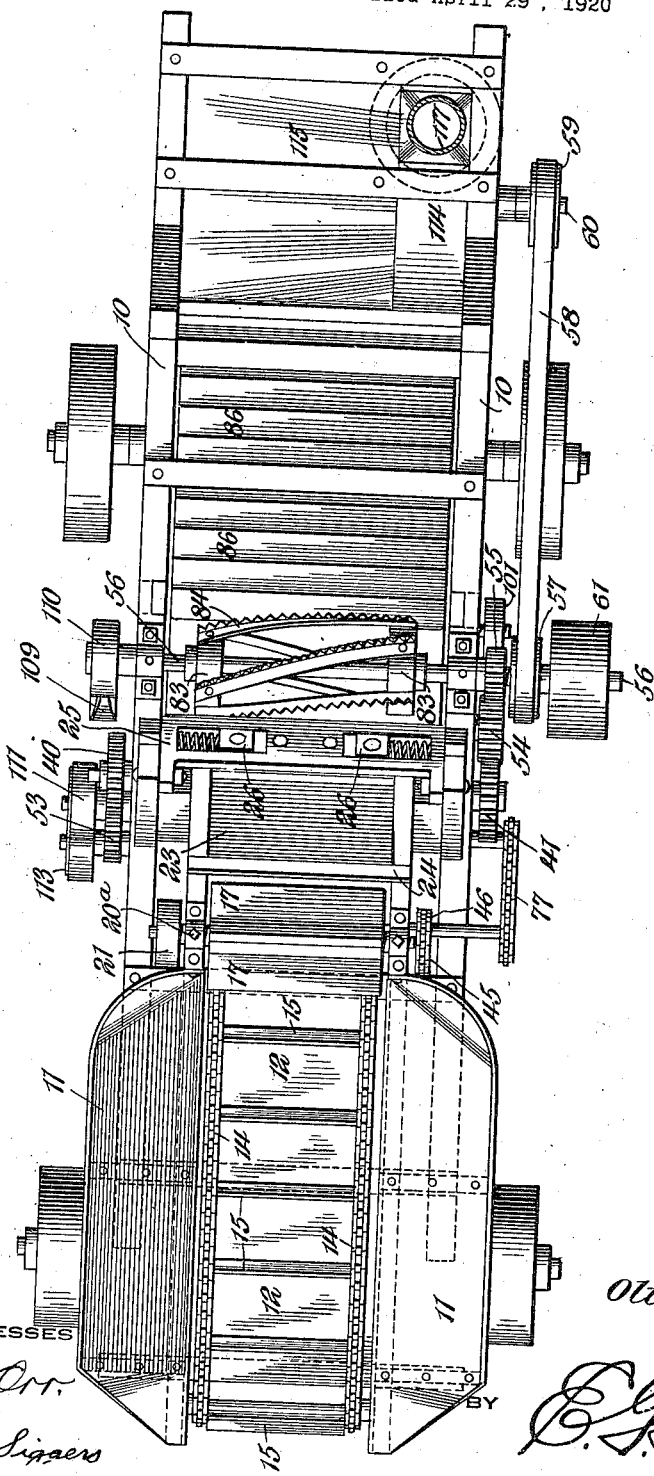

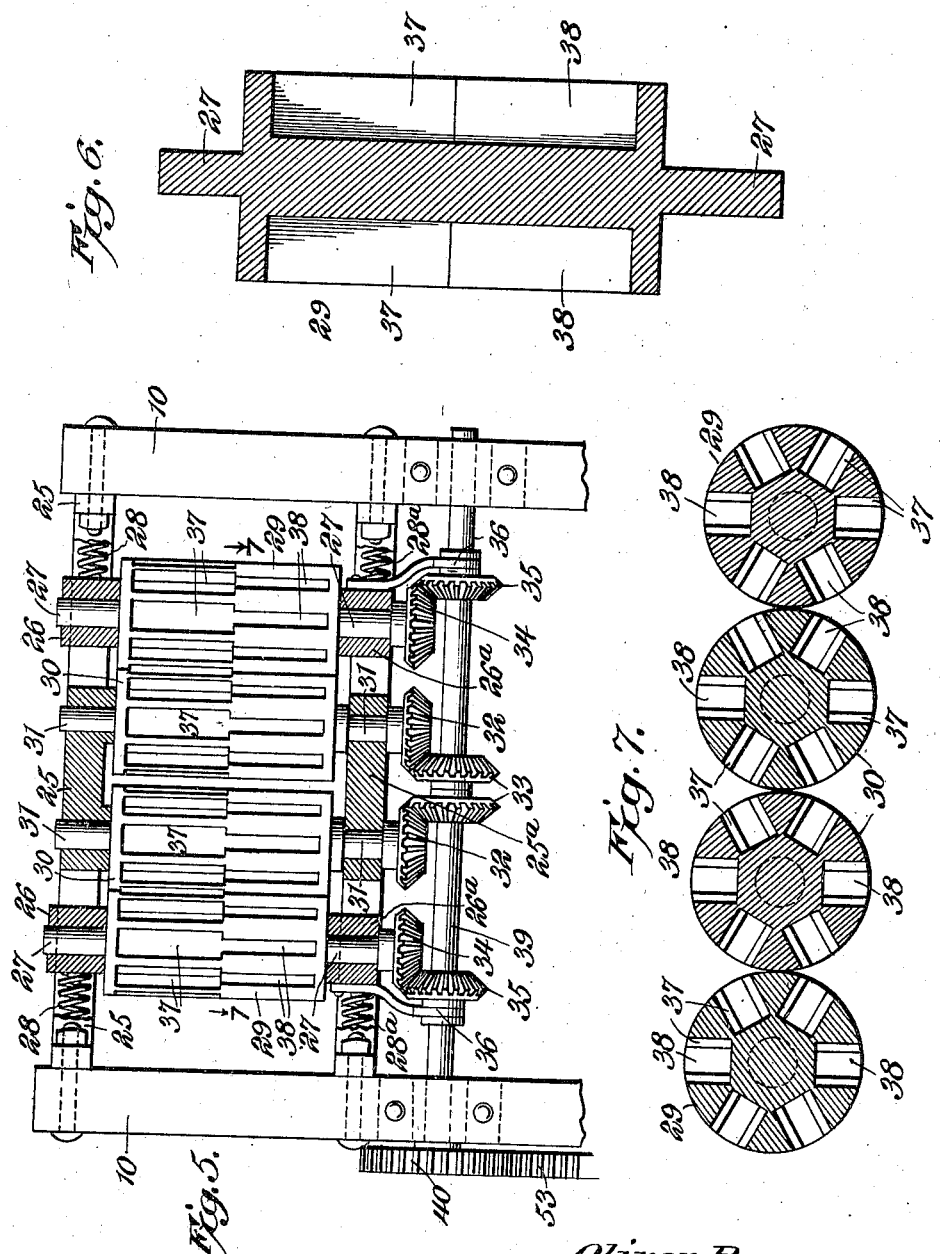

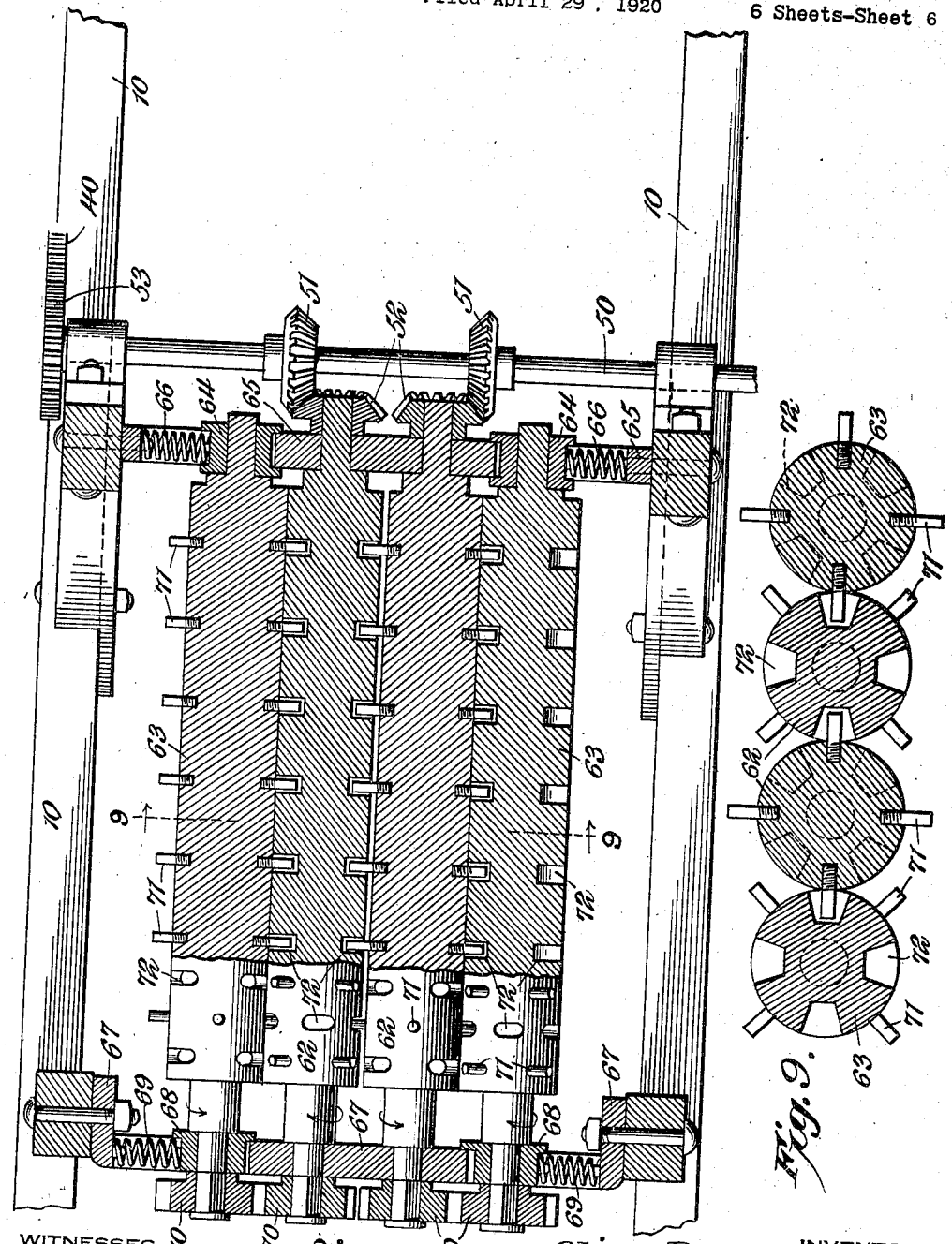

1,461,748

UNITED STATES PATENT OFFICE.

OLIVER BOYER, OF SPENCERVILLE, OHIO.

CORN HUSKER.

Application filed April 29, 1920. Serial No. 377,547.

*To all whom it may concern:*

Be it known that I, OLIVER BOYER, a citizen of the United States, residing at Spencerville, in the county of Allen and State of Ohio, have invented a new and useful Corn Husker, of which the following is a specification.

This invention relates to corn huskers.

The objects of the invention are to provide a machine which will remove the ears from the stalks, husk the ears without materially shelling the corn, shred the stalks, recover any shelled corn carried along by the stalks, and deliver the fodder to a stacking mechanism.

Another object is to provide in a corn husker means for dividing the bundles of corn into two parts so that the snapping rolls cannot be choked.

A further object is to provide a corn husker having a novel form of snapping rolls which are so mounted as to yield to excessive feed without danger of breakage of parts.

An additional object is to provide improved means for catching and saving all the kernels shelled either by the husking rolls or by the snapping rolls.

A still further object is to construct a corn husker in such a way that a continuous and even travel of the corn, of the husked ears and of the fodder is insured at all times.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:—

Fig. 1 is a side elevation of a machine embodying the principles of the present invention.

Fig. 2 is a longitudinal sectional view thereof looking from the same side of the machine.

Fig. 3 is an elevation from the side opposite to that shown in Fig. 1.

Fig. 4 is a top plan view.

Fig. 5 is a detail of the snapping rolls and their mounting on the frame.

Fig. 6 is an enlarged longitudinal section of one of the snapping rolls.

Fig. 7 is a section on the line 7—7 of Fig. 5.

Fig. 8 is a detail partly in cross section of the husking rolls and their mounting upon the frame.

Fig. 9 is a section on the line 9—9 of Fig. 8.

The numeral 10 denotes the main frame of the machine which may take any form desired, and, not forming an essential part of the invention, will not be described in detail. Secured to the frame at the forward end thereof is a pair of feeding inclines 11 on either side of a feeding conveyer running longitudinally therewith, as seen in Fig. 4. A feed table may be provided at the forward end of the machine to cooperate with the inclines 11, but such a feed table being common in nearly all types of corn huskers is not illustrated in the drawings.

The feeding conveyer, as seen in Figs. 2 and 4, comprises a plurality of sprockets 13 with which chains 14 are meshed, said chains carrying spaced transversely extending flights 15 which may have the form of angle irons. A horizontal platform 12 supports the feeding conveyer between the ends thereof.

Mounted above the inner end of the feeding conveyer and in spaced relation thereto is a bundle divider comprising a cylinder 16 having a plurality of arms 17 running longitudinally therewith. The arms 17 may be four in number and have blunt outer edges, being set radially with respect to the cylinder 16. The bearing block 18 in which the ends of the cylinder rotate may move vertically in frames 19. Within each frame is a coiled spring 20 bearing at one end against the bearing block 18 and at the other end against the tension regulator $20^a$. This bundle divider is rotated at a speed such that its linear velocity is approximately one-third less than the linear velocity of the feeding conveyer, thus the bundle divider is in effect a retarder for the bundles of corn carried into the machine by the feeding conveyer. This retarding action of the bundle divider permits only half of a bundle to go past the rotary divider at a time, or in other words by the slower movement of the retarder the upper half portion of the bundle is checked in its movement thus permitting the lower half of the bundle to progress more rapidly towards the snapping rolls. The upper half of the bundle being scraped off, as it were, from the lower half, gradually falls in place behind the lower half upon the feeding conveyer before it is permitted to enter the chamber 22 and be engaged by the snapping rolls. If the corn is very heavy, the divider will rise against the pressure of the springs 20, and thus prevents any possible breakage of parts, and will immediately return to its lower position when conditions become normal again.

The frame is provided with opposed walls 22 rising from the top thereof, which walls, in connection with the snapping rolls and with the bundle dividing element, provide what might be termed an ear-separating chamber. The bundle divider rotates substantially within this chamber and said chamber is closed at the top by a swingable cover 23 having a bar 24 along its free edge adapted to rest on the upper edges of the walls 22. This cover 23 may be swung out of the way so that an operator may reach down into the ear-separating chamber in case the mechanisms therein become clogged.

A plurality of snapping rolls, normally parallel to each other and set in an auxiliary frame 25 at an angle approximately sixty degrees with respect to the horizontal, are provided on that end of the ear-separating chamber opposite to where the feeding conveyer enters. The particular construction of these snapping rolls is best shown in Figs. 5, 6 and 7. There may be any number of these snapping rolls but there should be at least four comprising an inner pair and an outer pair. The outer pair has movable bearing blocks 26 which are guided by the frame 25 and have spindles 27 rotatable in said blocks. Springs 28 are secured at one end of the frame 25 and at the other end press against the bearing blocks 26. The parts so far described are duplicated in the lower auxiliary frame 25ª having the slidable bearing blocks 26ª. The springs 28ª act in unison with the springs 28 to normally maintain the outer snapping rolls 29 pressing against the adjacent inner rolls 30.

The inner rolls 30 have spindles 31 rotatable in the upper and lower auxiliary frames 25 and 25ª. These inner rolls are separated by a fixed interval and have no movement other than a rotary movement. The lower ends of the spindles 31 are secured to bevel gears 32 meshing with bevel gears 33 mounted on a shaft 39 running transversely of the machine and having bearings in the frame thereof. The shaft 39 is power driven by means to be described. The outer rolls 29 have bevel gears 34 connected at the lower ends with the spindles 27 and meshing with bevel gears 35 slidably mounted on the shaft 39. The bevel gears 35 are mounted so as to also rotate with the shaft 39 and with similar bevel gears 33. An arm 36 connects each bevel gear 35 with the corresponding bearing block 26ª, so that whatever the movement of these bearing blocks may be the gears 34 and 35 are at all times in mesh. Thus the outer rolls 29 may separate from the inner rolls 30 moving toward the outside of the machine and yet will be driven irrespective of their positions.

Each of the snapping rolls is provided with a plurality of longitudinally extending grooves each of which comprises a relatively wide portion 37 and a relatively narrow portion 38, both portions being of the same depth and each extending for approximately half the length of the rolls. The portions of the grooves are preferably rectangular in cross section. The provision of this particular type of groove makes the corn as it is fed to the rolls work down the rolls and the ears are snapped off by the lower part of the rolls having the narrow grooves. If the snapping rolls were provided with a smooth surface instead of a surface broken by the longitudinal slots 37 and 38, the feeding and snapping action of the rolls would be very feeble since any excessive pressure will force the rolls apart in view of the spring-held bearings in which the ends of the rolls are journaled. The cooperating edges of the wide slots 37 in adjacent snapping rolls act as jaws to forcibly grip the incoming ends of the corn stalks and start the feeding of the stalks through the rolls. Because of the inclination of the snapping rolls and the force of gravity, the stalks gradually work downwardly between the rolls where the narrow slots 38 are formed. The slots 38, although narrower than the slot 37, are sufficiently wide to grip the stalks and pull them through the rolls while snapping the ears off, but not wide enough to grip the ears of corn and shell them. If the stalks were drawn through the rolls where the wide slots are formed, the edges of the slots would grip the ears of corn and shell them instead of snapping them off from the stalks. The snapping or ear-separating chamber has a pivotally mounted apron or deflector 42 extending upwardly from the lower end thereof at an inclination with the upper end of the apron bearing against the lower auxiliary frame 25ª immediately below the lower ends of the snapping rolls. This apron guides the ears of corn snapped off by the rolls down to husking rolls below. Reference should be made particularly to Figs. 8 and 9 for an understanding of the construction of these husking rolls.

The husking rolls comprise a plurality of cylinders, which, like the snapping rolls, may be of any desired number and have at least one inner pair 62 fixed relatively and an outer pair 63 movable with respect to the inner pair. An auxiliary frame 65 is provided to support the upper ends of the inclined husking rolls 62, 63. The inner rolls 62 have bearings fixed upon this frame 65, while the outer rolls 63 have the slidable bearing blocks 64 guided by the frame 65. Coiled springs 66 bear at one end against the frame 65 and at the other end against the corresponding bearing block 64. Two of the inner rolls 62 have bevel gears 52 fixed upon the upper ends thereof, which bevel gears mesh with bevel gears 51 provided on a transverse shaft 50 having bearings on the main frame of the machine. The shaft 50 constitutes a driving shaft for the husking rolls and is rotated by means to be described. The lower ends of the fixed inner husking rolls 62 turn in a lower auxiliary frame 67 which is disposed with respect to the upper auxiliary frame 65, so that the husking rolls will lie at an incline slightly out of the horizontal of perhaps fifteen degrees. The lower auxiliary frame 67 carries springs 69 like the springs 66, and the lower ends of the outer rolls 63 turn in slidable bearings 68 provided on the auxiliary frame 67. Gears 70 are secured to each of the rolls 62, 63 at the lower ends thereof below the lower frame 67. The gears 70 provide means whereby each of the driven inner rolls 62 in turn rotates the adjacent outer roll 63.

The husking rolls are alike in being provided with a plurality of rows of pins 71 projecting from the peripheries thereof. These pins are arranged in longitudinal rows and the pins of the outer rolls are staggered with respect to the pins of the inner roll. The pins of each roll enter individual slots 72 in the adjacent roll. The rolls are all rotated at the same speed and the pins catch hold of the husks of the ears and tear them loose therefrom, delivering them upon a conveyer below while not causing any considerable shelling of the corn. If the feed of the corn is heavy, the outer rolls will separate from the inner rolls, thus permitting the husks to drop below without allowing the ears to pass.

In order to insure the proper travel of the ears down the inclined husking roll a conveyer 43 is provided above the husking rolls extending for substantially the entire length thereof. This conveyer 43 being made precisely like the feeding conveyer, above described, it is not thought necessary to enter into a detailed description of the same. The flights of the conveyer 43 have the necessary minimum speed to hold the ears upon the husking rolls long enough to insure clean ears delivered to the funnel or spout 121 at the forward end of the machine. The conveyer 43 might be said to be parallel to the inclined husking rolls, being spaced therefrom an equal distance throughout its length, and while acting as a retarder to prevent too fast a movement of the ears, also acts to force the ears down the rolls and prevent any clogging or piling up of the same.

Mounted directly below the husking rolls is a conveyer 74 which is parallel to the rolls and catches all the husks and shelled corn dropped by the rolls. This conveyer in construction is exactly like the feeding conveyer previously described. It passes over an inclined platform 73 provided for the purpose of catching the kernels which may be shelled by the husking rolls. The flights of the conveyer 74 moving over the platform 73 deliver this corn, together with the husks, to an oscillatory conveyer and kernel separator 85.

Mounted directly in rear of the snapping rolls is a fixed apron 82 appropriately shaped to deliver the fodder in a downward direction from the snapping rolls to the oscillatory conveyer 85. This apron 82 is preferably curved to cooperate with a shredder mounted immediately back of the snapping rolls approximately on the same level therewith. The shredder, seen best in Fig. 4, comprises a plurality of disks 83 upon which are secured spiral knives 84 having serrations or teeth, as shown. The shredder takes the fodder delivered on the rear side of the snapping rolls and tears the same particularly because of the spiral knives employed.

The fodder which is passed by the snapping rolls and cut by the shredder may contain a small amount of shelled corn. Also the husking rolls will inevitably shell a little of the corn, the conveyer 74 being provided to recover the kernals as specified. The husks carrying along with them this shelled corn and the fodder from the shredder also carrying with it the shelled corn are delivered upon a shaking oscillatory separator which also, by reason of its movement, acts as a conveyer. This oscillatory member comprises the body 85 disposed at an incline and being approximately parallel with the husking rolls and with the conveyer 74, although having its lower end beneath the discharging or upper end of said conveyer. The body 85 has a plurality of spaced slats 86 extending transversely thereof, openings 87 being provided between each slats and the slats all inclining upwardly toward the rear of the machine. Links 91 pivoted at their upper ends upon the main frame of the machine and pivotally connected at their lower end to the upper end of the body 85 movably support that end of the separator. Cooperating links 92 pivoted at their lower ends upon the frame 10 and pivotally secured at their upper ends to the lower ends of the separator cooperate with the links 91 to provide a mounting for the separator such that the separator may have an oscillatory and rocking motion imparted thereto. A link 81 is pivotally secured to the bottom 88 of the separator 85, and at its outer end is mounted upon a crank 80 formed in a shaft 79 running crosswise of the machine. This shaft is rotated by means to be presently described. The bottom 88 of the separator 85 has inclined walls 89 and an opening 90. The kernals separated by the shaking motion of the body 85 as the fodder and husks move over the slats 86 fall through the openings 87 and upon the bottom 88 or inclines 89, ultimately being delivered out through the opening 90. A vibratory screen 94 is disposed directly below the separator member 85. This vibratory screen is mounted upon links 95 like the links 91 and upon other links 96 corresponding to the links 92. The incline of the vibratory screen 94 is, however, opposite to the incline of the separator 85. Links 93 pivotally connected to each link 92 and also to the vibratory screen member 94 provide means whereby every oscillation of the separator 85 will bring about a like oscillation of the screen, though of less degree. The mesh of the screen of member 94 is sufficient to pass all the kernels of corn dropped through the opening 90 but will not permit chaff and bits of husks or fodder to pass therethrough. The vibratory screen member has an inclined bottom 97 which causes the corn dropped through the screen to move forwardly with respect to the machine, an inclined lip 98 being provided at the forward end of the bottom portion 97. The shaking of this screen member separates the kernels from the chaff, forces the kernels forwardly of the machine and the chaff rearwardly of the machine.

The shelled corn dropped from the downturned lip 98 falls into a box 99 directly below said lip, which box houses a spiral conveyer 100. This spiral conveyer is rotated, when the machine is in operation, and delivers the shelled corn at one end of the box where it may fall into a receptacle placed below.

A fan casing 106 houses a fan 105 extending transversely of the machine and fixed to a shaft 104. The fan casing 106 has approximately the same length as the width of the vibratory screen element 94 and has a nozzle or mouth 107 so shaped as to direct the draft from the fan into said screen member below the screen top thereof. The mouth 107 is spaced from the downturned lip 98 and the draft from the fan does not prevent passage of the kernels down the incline 97 as the screen members are vibrated. The fan blows the chaff off the screen member but is not strong enough to blow the kernels along with the chaff, with the result that the kernels are passed by the srceen while the chaff is delivered at the rear of the machine free of all kernels.

The fodder passed rearwardly by the oscillating conveyer 85 and the chaff blown rearwardly by the draft from the fan 105 are delivered upon an inclined and curved plate 115. A blower casing 114 is provided at one end of the plate 115 and a blower 116 creates a suction which draws the fodder on the plate up through the discharge pipe 117 and through a stacker 118. The stacker being of well known construction and forming no part of the present invention is not further described.

The means by which the different elements of the machine are actuated will now be described. A main drive pulley 61 receives power by means of a belt from an engine or motor of suitable character. This pulley is fixed upon a shaft 56 to which the shredder is attached. Upon the same end of the shaft 56 with the main drive pulley 61 is a smaller pulley 57. The pulley 57 drives the blower pulley 59 by means of a belt 58, the blower pulley 59 being secured to the blower shaft 60. A gear 55 is also secured to the shaft 56 (see Fig. 4), this gear meshing with an idler 54 in turn meshing with a gear 41 provided on one end of the shaft 39 which drives the snap rolls, as has been described.

The end of the shaft 56 remote from the main driving pulley 61 has a smaller pulley 110, and a belt 109 connects the pulley 110 with a pulley 108 driving the shaft 104 of the fan 105. The opposite end of shaft 104 carries a small pulley 103 driving pulley 101 by means of belt 102, the pulley 101 being fixed to the spiral conveyer 100.

The end of shaft 39 remote from the gear 41 carries a gear 40 meshing with another gear 53 secured upon the shaft 50 which drives the husking rolls, as has been described. The end of shaft 50 remote from gear 53 carries a sprocket 49, and a chain 48 meshes with sprocket 49 and with the larger sprocket 47. The sprocket 47 is secured to a shaft 13$^a$ to which the inner sprockets 13 are fastened. The sprockets 13, it will be remembered, carry the feeding conveyer. A small sprocket 46 (see Fig. 4) is also mounted on the shaft 13$^a$ to drive a larger sprocket 44 by means of a chain 45. The sprocket 44 in turn drives the conveyer 43 in the direction indicated. The shaft to which sprocket 44 is secured has a pulley 120 at the opposite end driving pulley 21 by means of a belt 119 (see Fig. 3); thus the bundle divider is rotated.

The same shaft that carries gear 53 also carries at the same end a pulley 111, which pulley drives another pulley 113 by means of belt 112 (see Fig. 3). Pulley 113 is mounted on shaft 79 mounted on the lower part of frame 10 and having the sprocket 78 at the opposite end thereof. Sprocket 78 is connected with sprocket 76 by means of chain 77, the sprocket 76 being fast to shaft 75, which, when rotated, operates conveyer 74. The shaft 79 has a crank 80 intermediate its length and to this crank a link 81 is secured, thus when the shaft 79 is rotated its motion will be translated into oscillatory movement by link 81 which will in turn transmit its motion to the shaking separator 85. When the separator 85 oscillates, the screen 94 moves therewith, as has been noted.

The above described means for operating the different parts of the machine in unison are only given as one example of many possible combinations of mechanical parts which might be employed and the invention is considered to be independent of any particular arrangement of pulleys or gearing which might be devised. It should be clear from the foregoing that the ear corn is delivered out from the spout 121 at the forward end of the machine, the shelled corn is delivered out of one end of the box 99, while the husks, fodder and chaff are delivered at the discharge end of the stacker.

What is claimed is:—

1. In a corn husker, a plurality of snapping rolls, each roll having a plurality of longitudinal grooves, each groove comprising a relatively wide portion and a relatively narrow portion.

2. In a corn husker, a plurality of snapping rolls, each roll having a plurality of longitudinal grooves, each groove comprising two parts of equal depth but of differing width and both parts being substantially rectangular in cross section, with the wide portion of each groove extending for approximately half the length of the roll.

3. In a corn husker, a plurality of snapping rolls arranged side by side in a position inclined with respect to the vertical, each roll having a plurality of longitudinal grooves and each groove comprising a relatively wide portion and a relatively narrow portion.

4. In a corn husker, a plurality of snapping rolls arranged side by side in a position inclined with respect to the vertical, a conveyer adapted to feed corn stalks toward the upper ends of said rolls, each roll having a plurality of longitudinal grooves, and each groove comprising a relatively wide portion extending to the upper end of the roll and a relatively narrow portion extending to the lower end of the roll.

5. In a corn husker, a plurality of snapping rolls, a conveyer adapted to feed corn stalks toward the upper ends of said rolls, the snapping rolls being inclined with respect to the vertical, each roll having a plurality of longitudinal grooves, and each groove comprising a relatively wide portion and a relatively narrow portion with the wide portion of each groove extending for approximately half the length of the roll.

6. In a corn husker, a feeding conveyer, a plurality of snapping rolls set side by side in a plane inclined out of the vertical with the lower ends of the rolls approximately on a level with the conveyer and spaced from the inner end of the conveyer, a plurality of husking rolls set side by side in a plane inclined out of the horizontal and below the feeding conveyer, means on the upper portions of the snapping rolls for gripping the stalks, and means on the lower portions of the rolls for snapping the ears.

7. In a corn husker, a feeding conveyer, a bundle divider, a plurality of snapping rolls set side by side inclined at an angle from the vertical and provided with a plurality of slots of different widths, whereby the fodder is first gripped and partially drawn inwardly by the upper portions of the rolls and then drawn inwardly for the rest of their length and the ears of corn snapped therefrom by the lower portions of the rolls.

8. In a corn husker, a plurality of inclined snapping rolls having driving pinions secured to their lower ends, a plurality of inclined husking rolls below the snapping rolls and having driving pinions secured to their upper ends, a pair of intergeared countershafts in driving relation to the pinions of the respective rolls, and an apron for directing the ears from the lower ends of the snapping rolls to the upper ends of the husking rolls and forming a guard for said gearing.

9. In a corn husker, a plurality of pairs of snapping rolls, a plurality of pairs of husking rolls in position to receive ears of corn fed from the snapping rolls, the two outer snapping rolls being movable with respect to the inner adjacent snapping rolls, the two outer husking rolls being movable relatively to the adjacent inner husking rolls, means for normally maintaining the outer snapping rolls pressed against the adjacent rolls, means for maintaining the outer husking rolls pressed against the adjacent husking rolls, gearing for driving the rolls, and means for maintaining the gearing for the outer rolls in the same relative position regardless of the position of the rolls.

In testimony that I claim the foregoing as my own, I have hereto affixed my signature.

OLIVER BOYER.